United States Patent
Nakajima et al.

(10) Patent No.: US 9,862,094 B2
(45) Date of Patent: Jan. 9, 2018

(54) INTERFERENCE CHECK SYSTEM FOR MACHINE TOOL AND ROBOT

(71) Applicant: FANUC Corporation, Yamanashi (JP)

(72) Inventors: Masatoshi Nakajima, Yamanashi (JP); Masakazu Ichinose, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 4 days.

(21) Appl. No.: 15/194,629

(22) Filed: Jun. 28, 2016

(65) Prior Publication Data

US 2016/0375582 A1    Dec. 29, 2016

(30) Foreign Application Priority Data

Jun. 29, 2015    (JP) ................... 2015-129514

(51) Int. Cl.
| | |
|---|---|
| G05B 19/04 | (2006.01) |
| G05B 19/18 | (2006.01) |
| B25J 9/16 | (2006.01) |
| G05B 19/4061 | (2006.01) |

(52) U.S. Cl.
CPC ........ *B25J 9/1666* (2013.01); *G05B 19/4061* (2013.01); *B25J 9/1656* (2013.01); *B25J 9/1664* (2013.01); *G05B 2219/40476* (2013.01)

(58) Field of Classification Search
CPC ....... B25J 9/16; B25J 9/1666; G05B 19/4061; G05B 2219/40476
See application file for complete search history.

(56) References Cited

U.S. PATENT DOCUMENTS

| | | | | |
|---|---|---|---|---|
| 5,339,015 A | * | 8/1994 | Hanaki ............ | G05B 19/4061 318/565 |
| 5,751,584 A | * | 5/1998 | Yuasa ............... | G05B 19/4061 700/166 |
| 6,754,555 B2 | * | 6/2004 | Yamato ............ | G05B 19/4061 700/178 |
| 7,764,039 B2 | * | 7/2010 | Yamaguchi ....... | G05B 19/4061 318/560 |

(Continued)

FOREIGN PATENT DOCUMENTS

| | | |
|---|---|---|
| EP | 1901150 A1 | 3/2008 |
| JP | 6-28019 A | 2/1994 |

(Continued)

OTHER PUBLICATIONS

Decision to Grant a Patent in JP Application No. 2015-129514, dated Aug. 1, 2017.

*Primary Examiner* — Rachid Bendidi
(74) *Attorney, Agent, or Firm* — Hauptman Ham, LLP

(57) ABSTRACT

A numerical controller and a robot controller share interpolation level move data obtained by recording position information for each interpolation period of a robot in association with an index. Based on the interpolation level move data, a preceding position of the robot after the passage of a time (lead time) for calculating a next preceding position since a reference time for interference check is calculated. And, based on the robot preceding position and a preceding position (machine preceding-position) of an axis of the machine after the passage of the lead time, interference between a machine and the robot is checked.

5 Claims, 5 Drawing Sheets

(56) References Cited

U.S. PATENT DOCUMENTS

| | | | |
|---|---|---|---|
| 8,140,177 B2* | 3/2012 | Ide | G05B 19/4061 |
| | | | 700/177 |
| 8,577,655 B2* | 11/2013 | Lin | G05B 17/02 |
| | | | 700/181 |
| 2006/0052901 A1 | 3/2006 | Nihei et al. | |
| 2007/0188116 A1 | 8/2007 | Aoyama et al. | |
| 2008/0024083 A1 | 1/2008 | Yamaguchi et al. | |

FOREIGN PATENT DOCUMENTS

| | | |
|---|---|---|
| JP | 6-149332 A | 5/1994 |
| JP | 8-202419 A | 8/1996 |
| JP | 10-83211 A | 3/1998 |
| JP | 2006068857 A | 3/2006 |
| JP | 2007-219642 A | 8/2007 |
| JP | 2008027376 A | 2/2008 |
| JP | 2009-279608 A | 12/2009 |
| JP | 2010-218036 A | 9/2010 |
| JP | 2010244256 A | 10/2010 |

* cited by examiner

INTERFERENCE CHECK SYSTEM FOR MACHINE TOOL AND ROBOT

RELATED APPLICATIONS

The present application claims priority to Japanese Patent Application Number 2015-129514, filed Jun. 29, 2015, the disclosure of which is hereby incorporated by reference herein in its entirety.

BACKGROUND OF THE INVENTION

Field of the Invention

The present invention relates to an interference check system for interference between a machine tool and a robot.

Description of the Related Art

Robots are widely used in combination with machine tools for workpiece attachment and removal or the like. Since a robot can get into a machine tool to attach or remove a workpiece, it is desirable that the machine tool and the robot be checked for interference.

Techniques described in Japanese Patent Applications Laid-Open Nos. 2008-27376 and 2010-244256 are used for interference check for a machine tool. According to these techniques, a numerical controller for controlling the machine tool outputs a preceding position, and the interference check is performed based on the output information so that the machine tool can be stopped before interference.

In checking interference between robots, moreover, teaching programs for the robots are read in advance by a technique described in Japanese Patent Application Laid-Open No. 2006-68857.

In order to check the interference between the machine tool and the robot by these conventional techniques, however, it is necessary to use the techniques described in Japanese Patent Applications Laid-Open Nos. 2008-27376 and 2010-244256 in which the preceding position is output by the numerical controller for controlling the machine tool. Also, it is necessary to output a preceding position on the robot side so that the interference check can be performed based on the preceding positions output individually from the numerical controller and a robot controller.

If an attempt is made to apply the technique of Japanese Patent Application Laid-Open No. 2006-68857 for robot-robot interference check to interference check between a machine tool and a robot (i.e., if this technique is applied regarding the machine tool as one robot), the robot can certainly obtain an NC program as information equivalent to a teaching program from a numerical controller for controlling the machine tool. Since a lead time for calculating a preceding position on the numerical controller dynamically varies depending on the type of interpolation, look-ahead state in a look-ahead buffer, or command for suppressing look-ahead, however, the NC program for controlling the machine tool cannot easily calculate the preceding position of the robot according to the lead time of the machine tool. Due to this problem, interference between the machine tool and the robot cannot be checked.

In contrast, even if the robot teaching program is obtained on the side of the numerical controller for controlling the machine tool, the lead time for calculating the preceding position also dynamically varies depending on the type of interpolation, look-ahead state in the look-ahead buffer, or command for suppressing look-ahead, so that it is difficult to calculate the preceding position of the machine tool according to the lead time of the robot.

SUMMARY OF THE INVENTION

Accordingly, the object of the present invention is to provide a numerical controller having an interference checking function ensuring synchronization of the respective lead times of a machine tool and a robot.

In the present invention, the above-described problems are solved as follows. Specifically, an offline programming device or the like is used to previously analyze a program on the side of a robot or a machine tool and create move information on the robot or the machine tool as indexed interpolation level move data. Then, the interpolation level move data is shared by a numerical controller and a robot controller so that a move start command for the robot controller can be given by the numerical controller or a move start command for the numerical controller can be given by the robot controller.

An interference check system according to the present invention comprises a numerical controller for drivingly controlling an axis of a machine based on a command from an NC program, a robot controller for controlling a robot based on a command from a teaching program, and an interference check device configured to check interference between the machine and the robot.

In a first aspect of the interference check system according to the present invention, the numerical controller and the robot controller share interpolation level move data obtained by recording position information for each interpolation period of the robot in association with an index. The numerical controller comprises: a look-ahead unit configured to read look-ahead block command data from the NC program; a lead time calculation unit configured to calculate a lead time for calculating a next preceding position; a machine preceding-position calculation unit configured to calculate a machine preceding position, which is a preceding position of the axis of the machine after the passage of the lead time since a reference time for the interference check; and a robot preceding-position calculation unit configured to calculate a robot preceding position, which is a preceding position of the robot after the passage of the lead time since the reference time for the interference check. The interference check device is configured to check the interference between the machine and the robot based on the machine preceding position and the robot preceding position.

The numerical controller may further comprise a robot move command unit configured to command the robot to start moving based on a robot move command included in the NC program, and the robot preceding-position calculation unit 240 may be configured to calculate the robot preceding position based on a move start command time given to the robot by the robot move command unit, the interpolation level move data, and the lead time.

The numerical controller may be configured to store state information on the robot including an index indicative of a current position of the robot and a move state of the robot, acquired by or notified from the robot controller, and the robot preceding-position calculation unit may be configured to calculate the robot preceding position based on the state information, the interpolation level move data, and the lead time.

In a second aspect of the interference check system according to the present invention, the numerical controller and the robot controller share interpolation level move data obtained by recording position information for each interpolation period of the machine in association with an index. The robot controller comprises: a look-ahead unit configured to read look-ahead block command data from the teaching program; a lead time calculation unit configured to calculate a lead time for calculating a next preceding position; a robot preceding-position calculation unit configured to calculate a robot preceding position, which is a preceding position of the axis of the robot after the passage of the lead time since a reference time for the interference check; and a machine preceding-position calculation unit configured to calculate a machine preceding position, which is a preceding position of the machine after the passage of the lead time since the reference time for the interference check. The interference check device is configured to check the interference between the robot and the machine based on the robot preceding position and the machine preceding position.

The robot controller may be configured to store state information on the machine including an index indicative of a current position of the machine acquired by or notified from the numerical controller, and the machine preceding-position calculation unit may be configured to calculate the machine preceding position based on the state information, the interpolation level move data, and the lead time.

According to the present invention, even in such a situation that a lead time for calculating a preceding position dynamically varies depending on the type of interpolation, look-ahead state in a look-ahead buffer, or command for suppressing look-ahead, a numerical controller or a robot controller can calculate the preceding position on the other side based on the varied lead time, so that synchronous preceding positions of a machine tool and a robot can be calculated.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
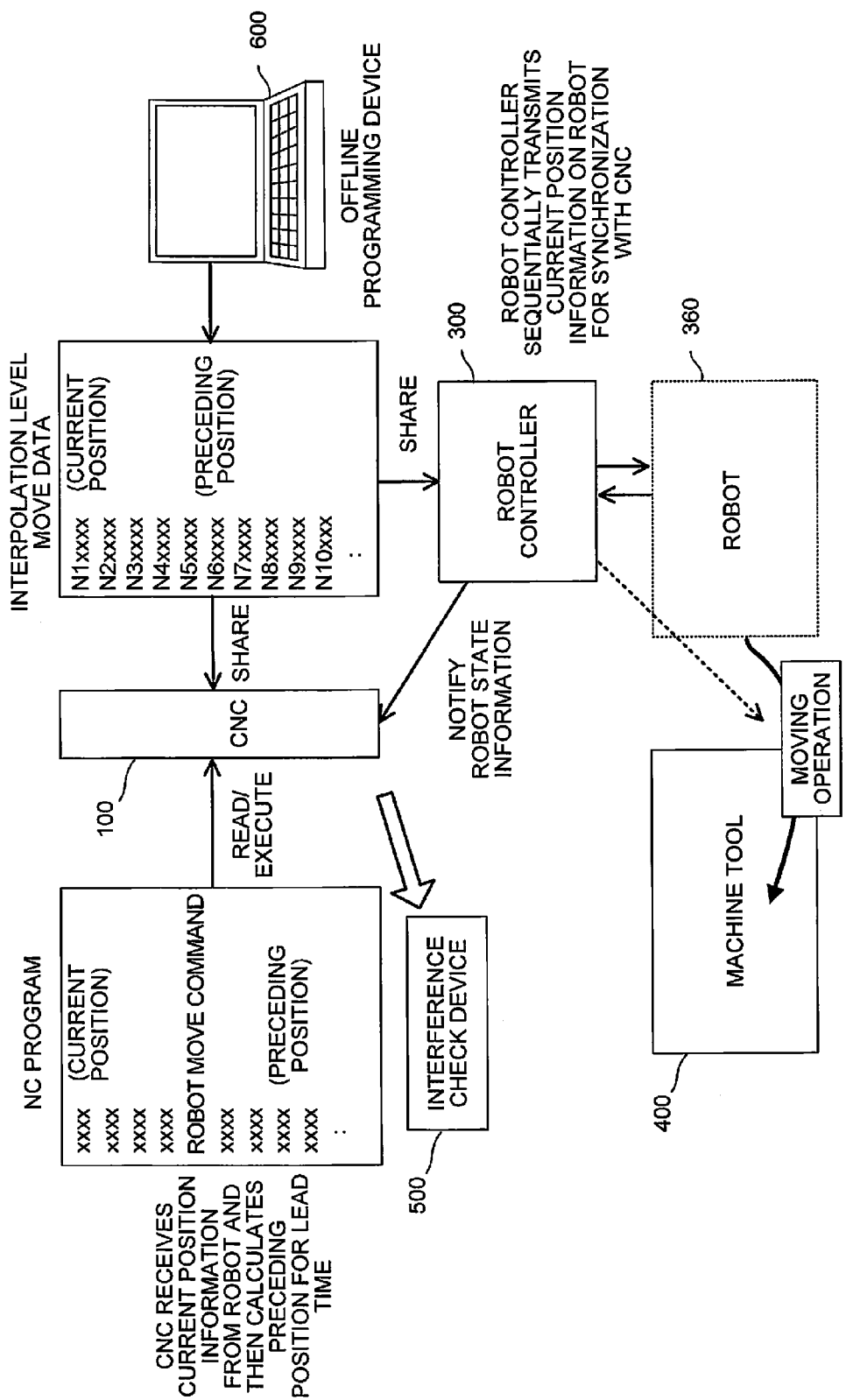
FIG. 1 is a schematic diagram of an interference check system according to one embodiment of the present invention.

An interference check system according to one embodiment of the present invention will be described with reference to FIG. 1.

The interference check system according to the embodiment comprises a numerical controller 100, robot controller 300, robot 360, machine tool 400, and interference check device 500.

Before starting machining control by the machine tool 400 and the robot 360, an offline programming device 600 or the like is used in advance to analyze a program executed on the robot controller 300 and create move information on the robot 360 based on the program, as indexed interpolation level move data. The created interpolation level move data is shared by the numerical controller 100 and the robot controller 300 so that a move start command for the robot 360 can be executed on the side of the numerical controller 100.

In the machining control based on the machining program, when the numerical controller 100 detects the move start command for the robot 360 in the machining program during preceding position calculation, it calculates the preceding position of the robot 360 along with that of the machine tool 400, based on the interpolation level move data on the robot 360 shared with the robot controller 300.

On receiving the move start command from the numerical controller 100, on the other hand, the robot controller 300 controls the operation of the robot 360 so that a position indicated by the interpolation level move data is reached, in consideration of compensation for arm deflection and gravity compensation, based on the interpolation level move data on the robot 360 shared with the numerical controller 100. Thus, an interpolation level position of the robot 360 shared with the numerical controller 100 can be matched with an actual position of the robot 360.

Since the numerical controller 100 and the robot controller 300 operate asynchronously, an error is gradually caused between the preceding position of the robot 360 calculated by the numerical controller 100 and that of the machine tool 400.

In order to compensate this error, the robot controller 300 feeds back the index added to the interpolation level move data indicative of the current position of the robot 360 and state information including information on the state of movement, which indicates whether the robot 360 is stopped or operating, to the numerical controller 100. On receiving the state information on the robot 360 fed back from the robot controller 300, the numerical controller 100 compensates the error between the preceding position being currently calculated and the actual current position of the robot 360, based on the index indicative of the current position of the robot 360 and the move state information included in the state information. The numerical controller 100 may be configured to acquire the state information on the robot 360 from the robot controller 300.

According to the above description, the move start command for the robot 360 is executed on the side of the numerical controller 100. Alternatively, however, the operation may be independently started on the side of the robot controller 300 without executing the robot move start command on the numerical controller side.

Figure 2:
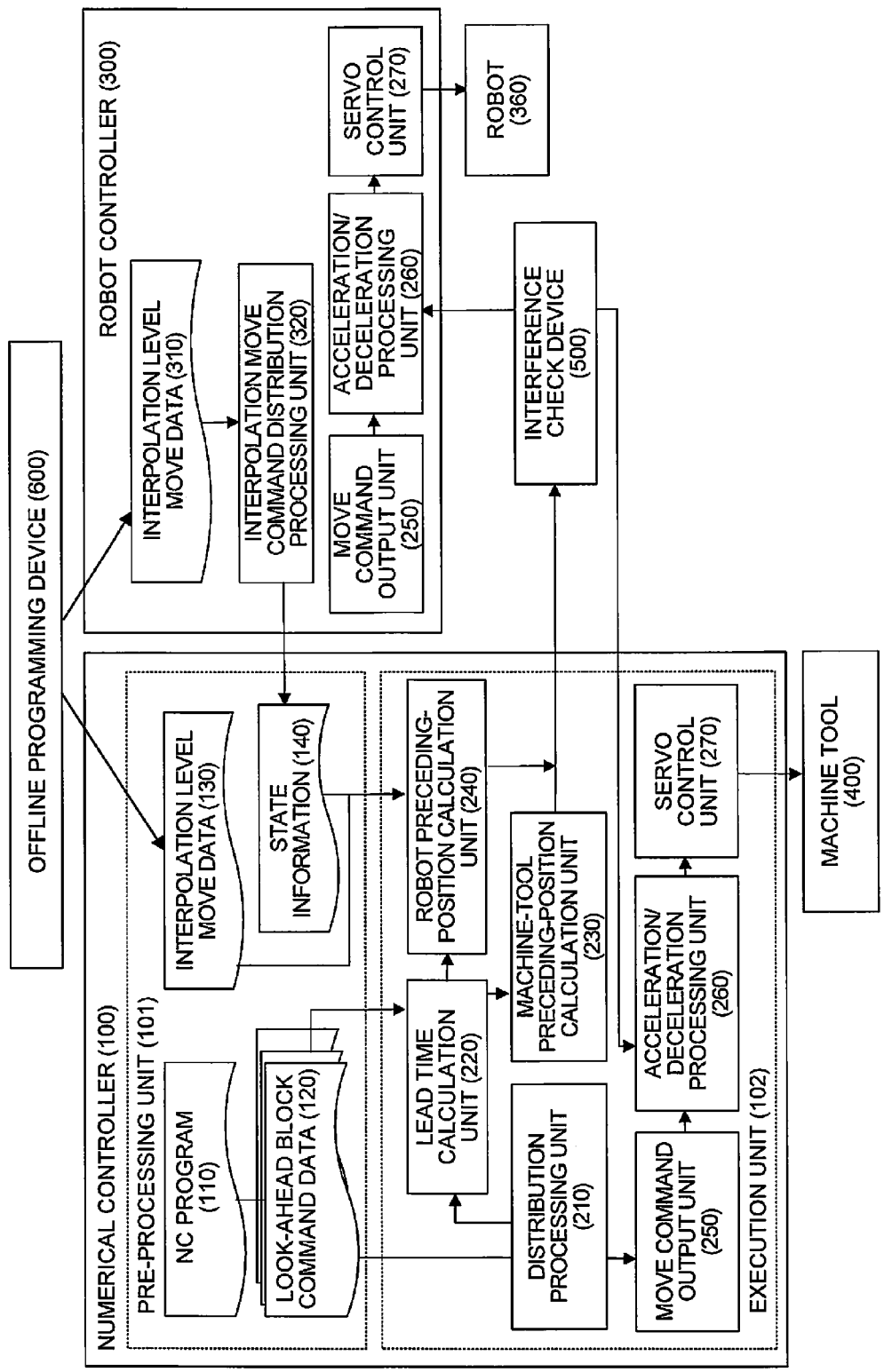
FIG. 2 is a schematic functional block diagram of the interference check system shown in FIG. 1.

FIG. 2 is a schematic functional block diagram of the interference check system shown in FIG. 1.

The numerical controller 100 controls the machine tool based on an NC program 110, calculates the preceding positions of respective axes of the machine tool 400 and the preceding position of the robot 360, based on look-ahead block command data 120, interpolation level move data 130 on the robot 360, and state information 140 on the robot 360, and performs processing for outputting the calculated preceding positions to the interference check device 500, wherein the look-ahead block command data 120 is acquired by looking ahead the NC program 110, the interpolation level move data 130 is previously created by means of the offline programming device 600 or the like and shared with the robot controller 300, and the state information 140 is notified or acquired from the robot controller 300.

The numerical controller 100 is divided into a pre-processing unit 101 and an execution unit 102. Various necessary data for the execution of control are generated in the pre-processing unit 101, and the control of the machine tool or the like is executed in the execution unit 102 based on the generated data.

The pre-processing unit 101 looks ahead the NC program 110 and stores the look-ahead block command data 120 in a memory (not shown). Further, The pre-processing unit 101 stores the interpolation level move data 130 on the robot 360, which is previously created by the offline programming device 600 or the like and shared with the robot controller 300, in a memory (not shown) and manages the state information 140 on the robot 360 sequentially notified or acquired from the robot controller 300.

A distribution processing unit 210 in the execution unit 102 reads the look-ahead block command data 120 for each block and performs distribution processing for interpolation move commands, based movement amounts of respective axes and speeds of respective axes which are commanded by the read block. In this way, the distribution processing unit 210 creates interpolation level distribution data to be commanded to movable parts of respective axes (servomotors for respective axes of the machine tool 400) for each distribution period.

The created interpolation level distribution data is output to a move command output unit 250 and then output to an acceleration/deceleration processing unit 260 through the move command output unit 250. On receiving a move command from the move command output unit 250, the acceleration/deceleration processing unit 260 performs acceleration/deceleration processing and outputs a move command of movement amount which is subjected to the acceleration/deceleration processing by the acceleration/deceleration processing unit 260 to a servo control unit 270 for controlling the servomotors for respective axes of the machine tool.

A lead time calculation unit 220 calculates a lead time t1 based on the look-ahead block command data 120, the interpolation level distribution data created by the distribution processing unit 210, and a predetermined reference lead time T. Based on the moving distance and speed in the command data subjected to the distribution processing by the distribution processing unit 210, the lead time calculation unit 220 calculates the reference lead time T as the lead time t1 if command data before the reference lead time T is accumulated in a buffer, but calculates the maximum time obtained from the command data in the buffer as the lead time t1 if no command data before the reference lead time T is accumulated. The reference lead time T is a time predetermined based on time required for interference check processing by the interference check device 500, time required for communication between the numerical controller 100 and the interference check device 500, time elapsed from the reception of a stop command by the axes of the machine tool 400 and the robot 360 until a deceleration stop, and the like. Since the details of the reference lead time T are disclosed in Japanese Patent Application Laid-Open No. 2008-27376 and the like described before, a description thereof will be omitted.

If there is a move start command for the robot 360 in the look-ahead block command data 120 when calculating the lead time t1, moreover, the lead time calculation unit 220 further calculates a time t2 from the current time to the execution of the move start command for the robot 360. The calculated robot move start time t2 is subtracted by the lead time calculation unit 220 for each processing period until the processing block of the NC program (or reference position for calculating the lead time) gets to a block for the move start command for the robot 360 so that t2=0 is achieved when the move start command is given to the robot 360. At this point in time, the robot 360 starts to be in a moving state. When the robot 360 is moving without the move start command therefor in the look-ahead block command data 120, t2=0 is set. When the robot 360 is at a standstill, t2=t1 is set. Accordingly, the robot move start time t2 is within a range, 0≤t2≤t1.

When the reference position for calculating the lead time reaches the position for the move start command for the robot 360 in the lead time calculation unit 220, moreover, the move start command for the robot 360 is given from the numerical controller 100 to the robot controller 300.

A machine-tool preceding-position calculation unit 230 calculates the preceding positions of respective axes of the machine tool 400 based on the lead time t1 calculated by the lead time calculation unit 220. Since method for calculating a preceding position of each axis of the machine tool is disclosed in Japanese Patent Application Laid-Open No. 2008-27376 and the like described before, a detailed description thereof will be omitted.

A robot preceding-position calculation unit 240 first obtains the current position of the robot 360, based on the interpolation level move data 130 and the state information 140 on the robot 360 which is sequentially notified or acquired from the robot controller 300, and then calculates a position (preceding position) of the robot 360 after the passage of the lead time t1, based on the obtained current position of the robot 360 and the interpolation level move data 130. The preceding position of the robot 360 is calculated in the following method. If each index of the interpolation level move data 130 (one interpolation period in the robot controller 300) is regarded as one unit, an index fpos indicative of the preceding position is first calculated according to the following equation (1), based on the interpolation period (cycle) of the numerical controller 100 and the robot controller 300, the lead time t1, the time t2 before the move start command for the robot 360, and an index cpos of the current position. Then, based on the calculated index fpos and the interpolation level move data 130, the preceding position can be obtained.

$$fpos = cpos + (t1-t2)/cycle. \quad (1)$$

If the interpolation periods of the numerical controller 100 is different from the interpolation periods of the robot controller 300, in some cases there is no appropriate, index of the interpolation level move data 130 which corresponds to the lead time. In such a case, position information indicated by a previous index corresponding to the lead time in the interpolation level move data 130 may be regarded as the preceding position of the robot 360. Alternatively, position information indicated by a subsequent index may be regarded as the preceding position of the robot 360. Further, a position intermediate between the position information indicated by the previous index and the position information indicated by the subsequent index or position information obtained by linearly interpolating the position information indicated by the previous index and the position information indicated by the subsequent index based on the lead time may be regarded as the preceding position of the robot 360.

If a period (fbcycle) for the acquisition of the state information 140 from the robot controller 300 is then coincident with the interpolation periods of the numerical controller 100 and the robot controller 300, the respective preceding positions of the machine tool 400 and the robot 360 are always kept synchronous.

If fbcycle>cycle is established, an error occurs in the synchronization of the preceding positions. However, this error is compensated when the index indicative of the current position of the robot 360 and the state information 140 including the move state are acquired.

If the index fpos indicative of the preceding position exceeds the maximum index value of the interpolation level move data 130, the robot 360 is regarded as being stopped. When the robot 360 is at a standstill, the preceding position of the robot 360 after the passage of the lead time can be matched with the current position by setting t2=t1.

Figure 3:
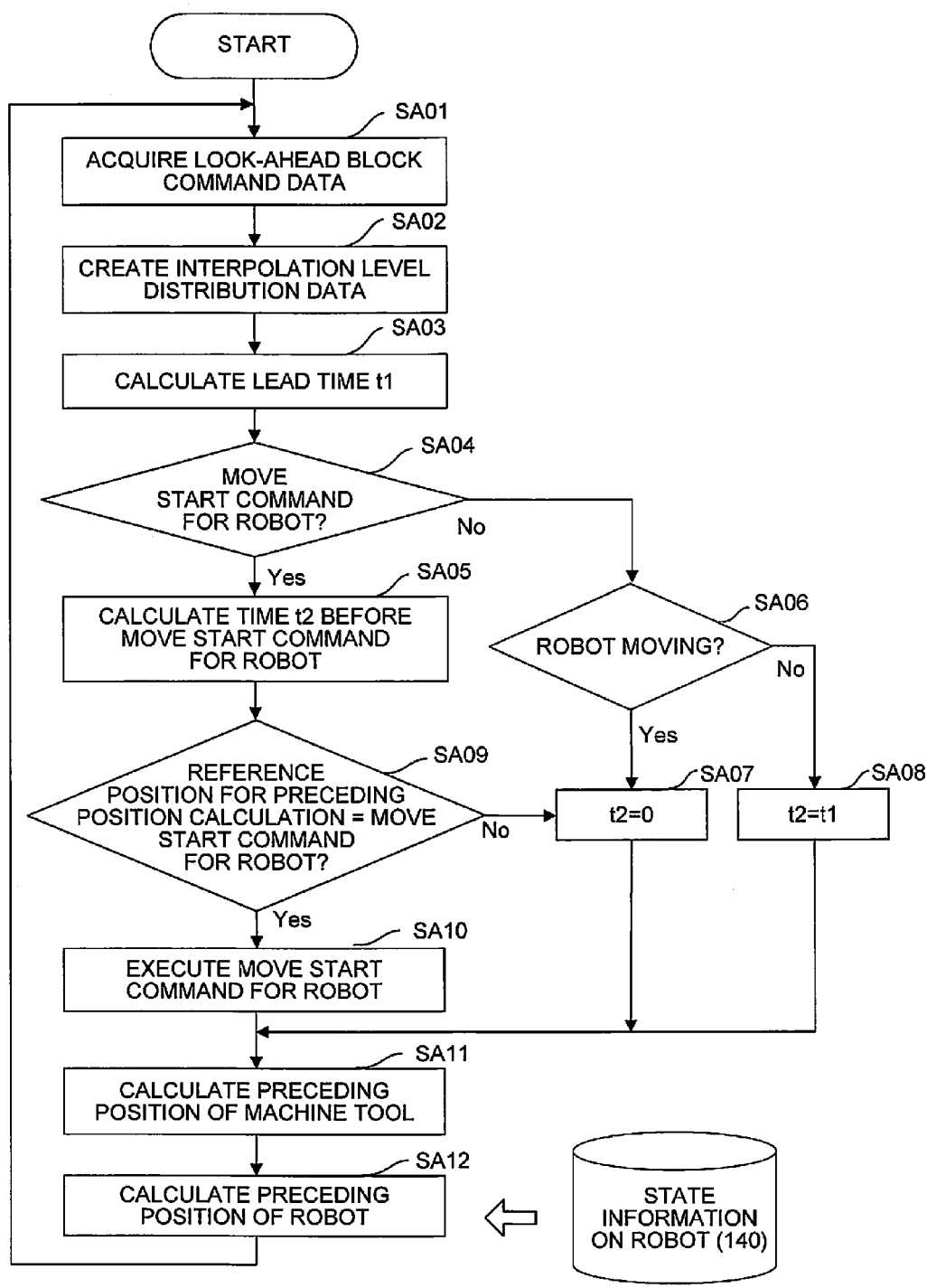
FIG. 3 is a flowchart showing a first example of processing performed on a numerical controller constituting the interference check system of FIG. 2.

FIG. 3 is a flowchart showing a flow of processing performed on the numerical controller 100 constituting the interference check system of FIG. 2.

[Step SA01] The NC program 110 is read in advance and the look-ahead block command data 120 is acquired.

[Step SA02] The distribution processing unit 210 creates the interpolation level distribution data based on the look-ahead block command data 120.

[Step SA03] The lead time calculation unit 220 calculates the lead time t1 from the look-ahead block command data 120 acquired in Step SA01 and the interpolation level distribution data created in Step SA02.

[Step SA04] It is determined whether or not the move start command for the robot 360 is included in the look-ahead block command data 120 acquired in Step SA01. If the move start command for the robot 360 is included, the processing proceeds to Step SA05. If the move start command for the robot 360 is not included, the processing proceeds to Step SA06.

[Step SA05] The time t2 elapsing from the current time to the execution of the move start command for the robot 360 is calculated.

[Step SA06] Whether or not the robot 360 is currently moving is determined with reference to the state information 140 or the like. If the robot 360 is moving, the processing proceeds to Step SA07. If the robot 360 is not moving, the processing proceeds to Step SA08.

[Step SA07] The time t2 before the move start command for the robot 360 is set to 0.

[Step SA08] The time t2 before the move start command for the robot 360 is set to t1.

[Step SA09] It is determined whether or not the reference position for calculating the lead time has reached the position for the move start command for the robot 360. If the position for the move start command is reached, the processing proceeds to Step SA10. If the position for the move start command is not reached, the processing proceeds to Step SA07.

[Step SA10] The move start command for the robot 360 is given to the robot controller 300.

[Step SA11] The preceding position of each axis of the machine tool 400 is calculated.

[Step SA12] The preceding position of the robot 360 is calculated based on the state information 140 on the robot 360, whereupon the processing returns to Step SA01.

The present invention is also applicable to a configuration in which the numerical controller 100 and the robot controller 300 operate independently of each other without executing the move start command for the robot 360 on the side of the numerical controller 100.

Figure 4:
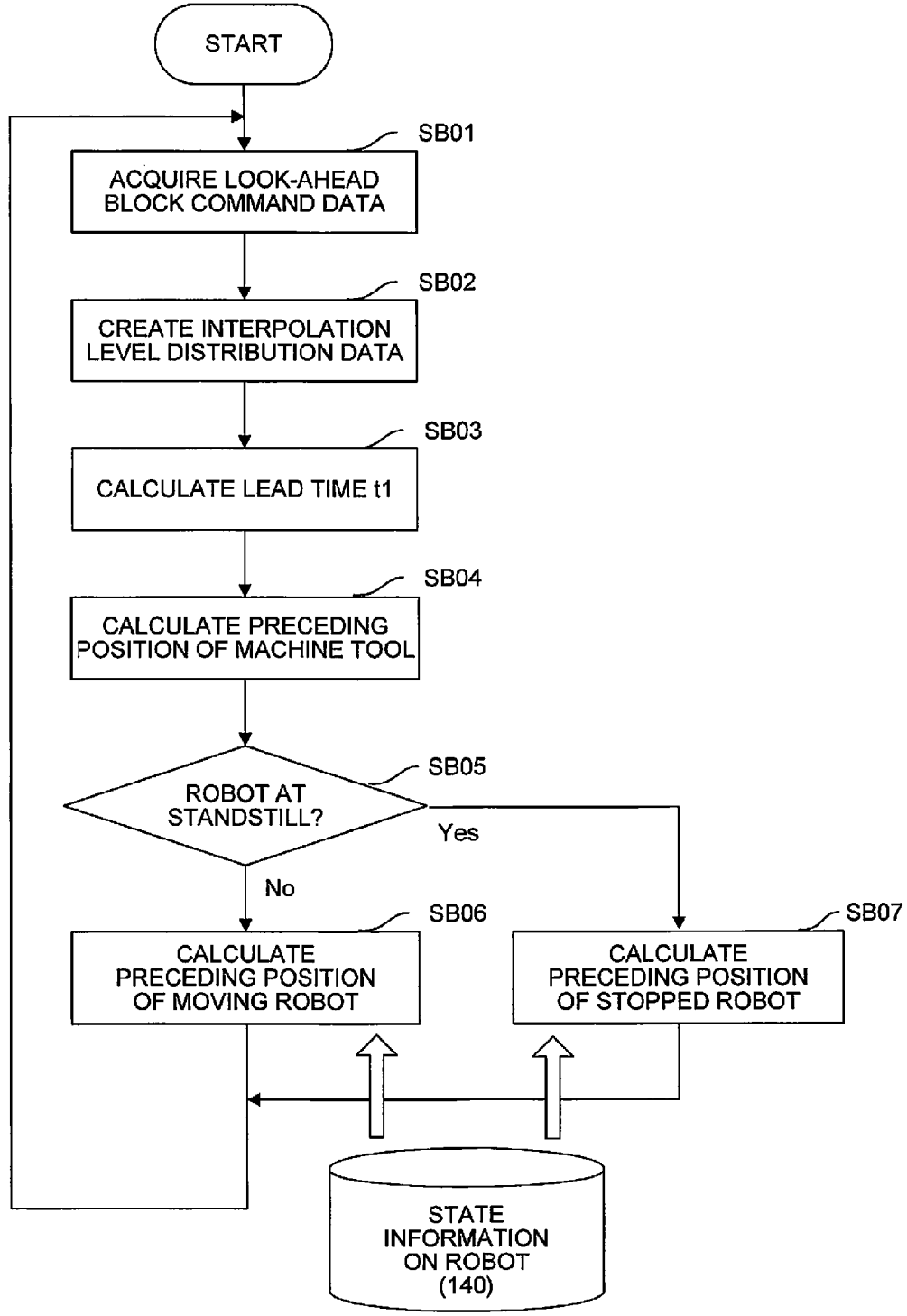
FIG. 4 is a flowchart showing a second example of the processing performed on the numerical controller constituting the interference check system of FIG. 2.

FIG. 4 is a flowchart showing processing performed on the numerical controller 100 in the case where the numerical controller 100 and the robot controller 300 operate independently of each other without executing the move start command for the robot 360 on the side of the numerical controller 100 in the interference check system of FIG. 2.

[Step SB01] The NC program 110 is read in advance and the look-ahead block command data 120 is acquired.

[Step SB02] The distribution processing unit 210 creates the interpolation level distribution data based on the look-ahead block command data 120.

[Step SB03] The lead time calculation unit 220 calculates the lead time t1 from the look-ahead block command data 120 acquired in Step SB01 and the interpolation level distribution data created in Step SB02.

[Step SB04] The preceding positions of respective axes of the machine tool 400 are calculated.

[Step SB05] Whether or not the robot 360 is at a standstill is determined with reference to the state information 140 or the like. If the robot 360 is not at a standstill, the processing proceeds to Step SB06. If the robot 360 is at a standstill, the processing proceeds to Step SB07.

[Step SB06] The preceding position of the moving robot 360 is calculated based on the interpolation level move data 130 and the state information 140 on the robot 360 that is acquired or notified from the robot controller 300, whereupon the processing returns to Step SB01. If the index of the interpolation level move data 130 on the robot 360 is regarded as one unit, for example, the index fpos indicative of the preceding position of the robot 360 can be calculated as fpos=cpos+t1/cycle, based on the interpolation period (cycle) of the numerical controller 100 and the robot controller 300, lead time t1, and index cpos of the current position.

[Step SB07] The preceding position of the stopped robot 360 is calculated based on the interpolation level move data 130 and the state information 140 on the robot 360 that is acquired or notified from the robot controller 300, whereupon the processing returns to Step SB01. If the index of the interpolation level move data 130 on the robot 360 is regarded as one unit, for example, the index fpos indicative of the preceding position of the robot 360 can be calculated as fpos=cpos, based on the interpolation period (cycle) of the numerical controller 100 and the robot controller 300, lead time t1, and index cpos of the current position.

According to the configuration described above, the robot controller can achieve an interference checking function for the machine tool and the robot only if it is provided with a function capable of notifying the numerical controller of the index indicative of the current position of the robot and the information indicative of the move state or enabling the numerical controller to acquire the information.

Even if the lead time for calculating the preceding position dynamically varies depending on the type of interpolation, look-ahead state in the look-ahead buffer, or command for suppressing look-ahead, moreover, the numerical controller can calculate the preceding position of the robot based on the varied lead time. Thus, the synchronous preceding positions of the machine tool and the robot can be calculated.

Furthermore, an error between the preceding positions of the machine tool and the robot can be compensated to a minimum by acquiring index information indicative of the current position of the robot and information indicative of the move state.

While embodiments of the present invention have been described herein, the invention is not limited to the above-described embodiments and may be suitably modified and embodied in various forms.

In the embodiment described above, for example, the teaching program executed on the robot controller 300 is analyzed in advance by means of the offline programming device 600 or the like, and the move information on the robot 360 is created as the indexed interpolation level move data and shared between the numerical controller 100 and the robot controller 300. In contrast, however, the NC program executed on the numerical controller 100 may be analyzed in advance by means of the offline programming device 600 or the like. In this case, the move information on the machine tool 400 is created as the indexed interpolation level move data, and the created indexed interpolation level move data are individually shared as the interpolation level move data 130 and interpolation level move data 310 between the numerical controller 100 and the robot controller 300.

Figure 5:
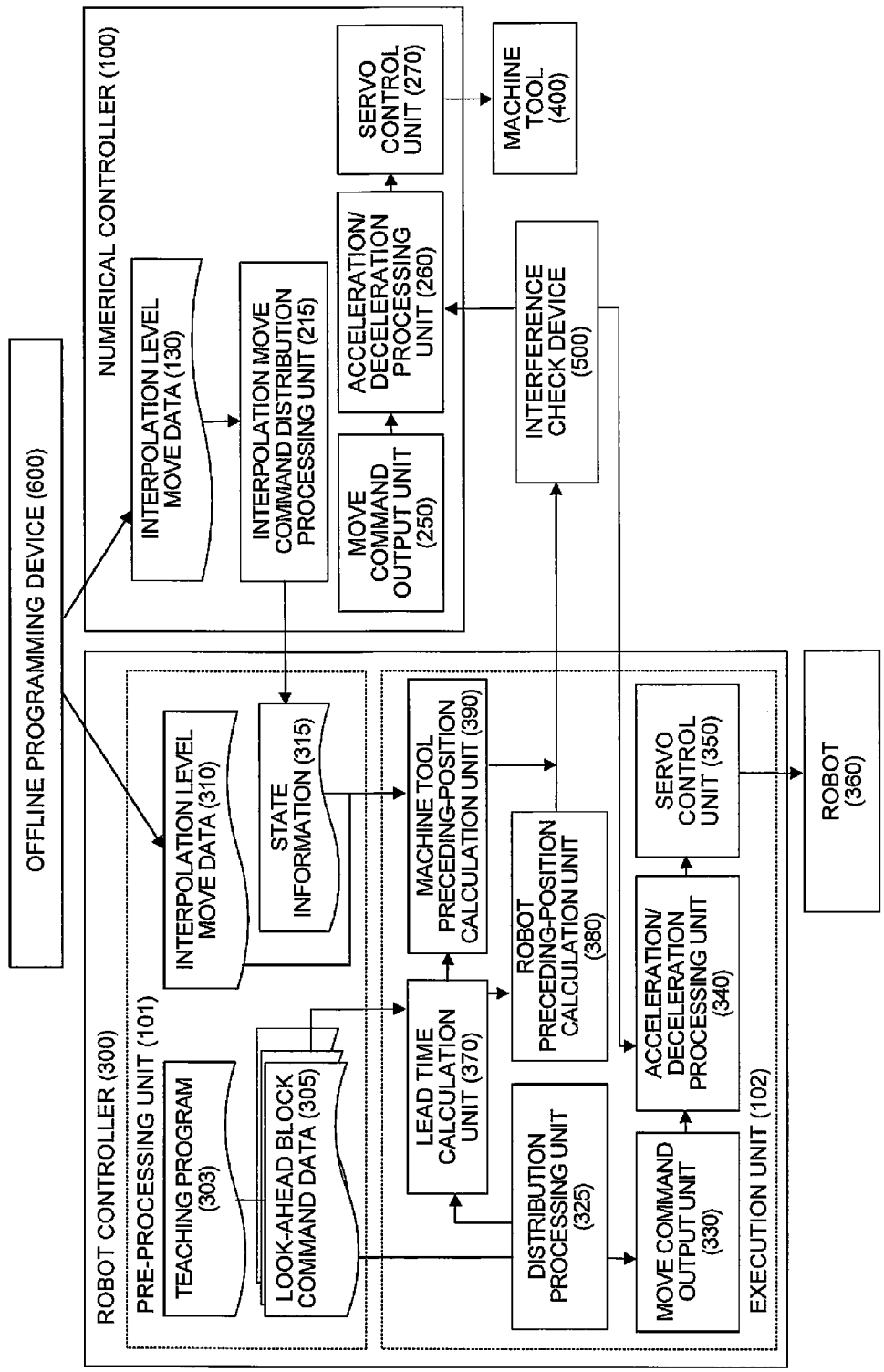
FIG. 5 is a schematic block diagram of an interference check system according to another embodiment of the present invention.

In this case, as shown in FIG. 5, a lead time calculation unit 370, robot preceding-position calculation unit 380, and machine-tool preceding-position calculation unit 390, which correspond to the lead time calculation unit 220, machine-tool preceding-position calculation unit 230, and robot preceding-position calculation unit 240, respectively, mounted on the numerical controller 100 according to the above-described embodiment, are individually mounted on the robot controller 300 to calculate the preceding positions of the machine tool 400 and the robot 360 and notify the interference check device 500 of the calculated preceding positions.

In this arrangement, the numerical controller 100 should only be configured to feed back the state information including the index added to the interpolation level move data 130 indicative of the current position of the machine tool to the robot controller 300 so that the robot controller 300 can compensate the error between the preceding position being currently calculated and the actual current position of the robot 360, based on the fed-back state information.

The invention claimed is:

1. An interference check system comprising a numerical controller for drivingly controlling an axis of a machine based on a command from an NC program, a robot controller for controlling a robot based on a command from a teaching program, and an interference check device configured to check interference between the machine and the robot,
wherein the numerical controller and the robot controller share interpolation level move data obtained by recording position information for each interpolation period of the robot in association with an index, and
the numerical controller comprises:
a look-ahead unit configured to read look-ahead block command data from the NC program;
a lead time calculation unit configured to calculate a lead time for calculating a next preceding position;
a machine preceding-position calculation unit configured to calculate a machine preceding position, which is a preceding position of the axis of the machine after the passage of the lead time since a reference time for the interference check; and
a robot preceding-position calculation unit configured to calculate a robot preceding position, which is a preceding position of the robot after the passage of the lead time since the reference time for the interference check, and wherein
the interference check device is configured to check the interference between the machine and the robot based on the machine preceding position and the robot preceding position.

2. The interference check system according to claim 1, wherein the numerical controller further comprises a robot move command unit configured to command the robot to start moving based on a robot move command included in the NC program, and
the robot preceding-position calculation unit is configured to calculate the robot preceding position based on a move start command time given to the robot by the robot move command unit, the interpolation level move data, and the lead time.

3. The interference check system according to claim 1, wherein the numerical controller is configured to store state information about the robot including an index indicative of a current position of the robot and a move state of the robot, acquired by or notified from the robot controller, and
the robot preceding-position calculation unit is configured to calculate the robot preceding position based on the state information, the interpolation level move data, and the lead time.

4. An interference check system comprising a numerical controller for drivingly controlling an axis of a machine based on a command from an NC program, a robot controller for controlling a robot based on a command from a teaching program, and an interference check device configured to check interference between the machine and the robot,
wherein the numerical controller and the robot controller share interpolation level move data obtained by recording position information for each interpolation period of the machine in association with an index, and
the robot controller comprises:
a look-ahead unit configured to read look-ahead block command data from the teaching program;
a lead time calculation unit configured to calculate a lead time for calculating a next preceding position;
a robot preceding-position calculation unit configured to calculate a robot preceding position, which is a preceding position of the robot after the passage of the lead time since a reference time for the interference check; and
a machine preceding-position calculation unit configured to calculate a machine preceding position, which is a preceding position of the axis of the machine after the passage of the lead time since the reference time for the interference check, and wherein
the interference check device is configured to check the interference between the robot and the machine based on the robot preceding position and the machine preceding position.

5. The interference check system according to claim 4, wherein the robot controller is configured to store state information about the machine including an index indicative of a current position of the axis of the machine acquired by or notified from the numerical controller, and
the machine preceding-position calculation unit is configured to calculate the machine preceding position based on the state information, the interpolation level move data, and the lead time.

* * * * *